Patented Dec. 8, 1942

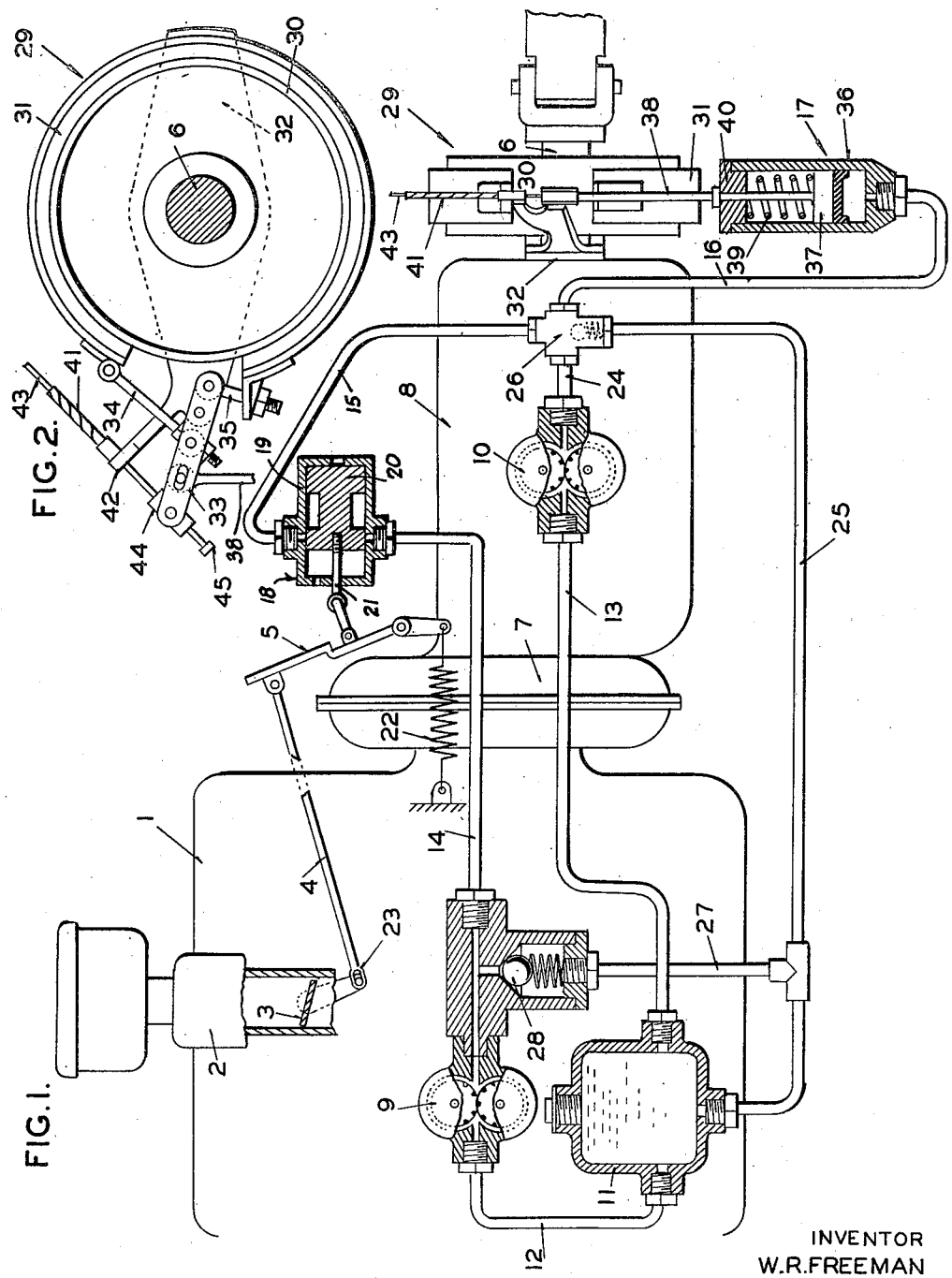

2,304,560

UNITED STATES PATENT OFFICE 2,304,560

BRAKE CONTROL MECHANISM

Walter R. Freeman, Clayton, Mo., assignor to Wagner Electric Corporation, St. Louis, Mo., a corporation of Delaware Application June 19, 1941, Serial No. 398,702

9 Claims. (Cl. 192—3)

My invention relates to control means and more particularly to control means for a brake of a motor vehicle.

One of the objects of my invention is to provide improved control means for a brake of a motor vehicle whereby said brake can be held applied under certain conditions to prevent movement of the vehicle.

Another and more specific object of my invention is to provide means for so controlling a brake by a vehicle hydraulic pressure system including pumps driven by the engine and by the propeller shaft of the vehicle that the brake will be automatically applied when the vehicle is brought to a stop and released when the vehicle is started.

Yet another object of my invention is to so associate a hydraulic pressure system of the type referred to with a brake and control said system by the accelerator mechanism for the engine of the vehicle that the brake will be applied only when the vehicle is stopped and the accelerator mechanism is in released position and said brake will be disengaged when the accelerator mechanism is operated to start the vehicle and maintained disengaged as long as the vehicle is moving.

Other objects of my invention will become apparent from the following description taken in connection with the accompanying drawing in which Figure 1 is a schematic view of a brake and parts of a vehicle having associated therewith brake control means embodying my invention; and Figure 2 is an end view of the brake and actuating parts therefor.

Referring to the drawing in detail, I have illustrated my improved brake control means as being associated with a vehicle provided with an automatic change speed transmission including a fluid coupling, said transmission and coupling being commonly known as a "Hydromatic" transmission. This transmission embodies as a part of its automatic gear shifting means two hydraulic systems including separate hydraulic pumps, one of which is driven by the engine and the other of which is driven by the propeller shaft. These pumps in the particular embodiment shown are employed as part of my improved control means for also controlling a brake and in the drawing the manner in which said pumps are connected to control the special transmission is not illustrated as such does not in any way concern the operation of the brake control means. It is to be understood, however, that although the pumps shown are intended to be a part of the automatic change speed transmission, separate pumps may be employed if desired without in any way changing the operation of the control means for the brake.

As shown in the drawing, numeral 1 indicates an engine of a vehicle having a carburetor 2, including a butterfly valve 3, for controlling the amount of engine fuel. The butterfly valve is connected by a rod 4 to the usual accelerator pedal 5 mounted in the operator's compartment of the vehicle. The engine 1 is connected to the propeller shaft 6 of the vehicle by means of the fluid coupling 7 and the automatic transmission 8, said propeller shaft driving the wheels of the vehicle in the usual manner by being connected through differential gearing not shown. The engine drives the gear pump 9 and the propeller shaft drives the gear pump 10, these pumps generating hydraulic pressure for controlling the automatic changing of the speed ratios of the transmission 8 in a known manner.

Associated with gear pumps 9 and 10 is a sump 11, the inlet to pump 9 being connected thereto by a conduit 12 and the inlet to pump 10 being connected thereto by a conduit 13. The outer or pressure side of pump 9 is connected by conduits 14, 15, and 16 to a fluid motor 17, the purpose of which will be subsequently referred to. Interposed between conduits 14 and 15 and positioned adjacent the accelerator pedal is a shut-off valve 18 comprising a cylindrical casing 19 and a movable valve element 20, said element being connected to the accelerator pedal by the articulated rod 21. The element is so arranged that when the accelerator pedal is in released position under the action of spring 22, said element will cut off communication between conduits 14 and 15 and when the accelerator pedal is depressed, said element will assume a position permitting communication between said conduits. In order that element 20 may be moved to a slight open position before the accelerator pedal operates the butterfly valve to speed up the engine, the rod 4 is provided with a lost motion connection 23 with the arm of the butterfly valve.

The outlet or pressure side of the gear pump 10 is also connected to communicate with the fluid motor 17 by means of a conduit 24 connected with conduit 16 so that fluid pressure generated by pump 10 can also be effective in operating the fluid motor.

In order to permit fluid to flow back to the sump when the pressure in the fluid motor 17 becomes excessive, there is provided a return conduit 25 and associated with this conduit is a pressure relief valve 26. There is also provided a conduit 27 and a pressure relief valve 28 for permitting flow of fluid to the sump from pump 9 when the pressure developed thereby becomes excessive due to the shut-off valve 18 being closed.

Associated with the propeller shaft is a brake 29 comprising a drum 30 secured to the propeller shaft and a cooperating brake band 31 anchored to a suitable support 32 fixed to the rear end of the transmission housing. The brake band is actuated by a pivoted lever 33 which is connected on opposite sides of its pivot by adjustable links 34 and 35 to the ends of the brake band. The actuating lever is adapted to be controlled by the fluid motor 17 already referred to, said motor comprising a cylinder 36 having reciprocable therein a piston 37. This piston is connected to the lever by a piston rod 38. Within the cylinder is a relatively strong spring 39 interposed between the piston and the end 40 of the cylinder and acting to move the piston to a position where lever 33 will be operated to apply the brake band to the drum. Thus it is seen that the brake is applied by spring action. The brake is released by fluid pressure entering cylinder 36 of the fluid motor by way of conduits 16, this fluid pressure moving the piston rearwardly to compress the spring and cause the brake band to be disengaged from the drum.

In addition to the fluid motor for controlling the brake, there is also provided a manual control means which is shown as a Bowden control. The sheath 41 of this Bowden control is secured to a projection 42 on the support 32, and the cable 43 is connected to the outer end of the brake band actuated lever 33, said connection comprising a sleeve 44 pivoted to the lever and a collar 45 on the end of the cable. The cable may be operated by any suitable manual member positioned in a convenient place such as the operator's compartment of the vehicle.

Referring to the operation of the above described control means, when the vehicle is stopped and the accelerator pedal is in released position, there will be no fluid under pressure in cylinder 36 of the fluid motor 17 and, therefore, piston 37 will be moved by spring 39 to the position shown, thus causing the brake band to be engaged with the drum and the brakes applied. Thus, if the vehicle is on an inclined roadway, it will be held from rolling. Also, the vehicle will not be capable of "creeping" due to the torque transmitted by the fluid coupling. Fluid pressure will not be present in cylinder 36 when the accelerator mechanism is released due to the fact that the shut-off valve 18 is closed and pump 10 is not operating because the propeller shaft is not rotating. Any residue pressure which might be in cylinder 36 is relieved by leakage of the gears of pump 10.

When the vehicle is started, the accelerator pedal will be depressed to speed up the engine. The depressing of the pedal will cause the shut-off valve 18 to be opened and the fluid pressure developed by pump 9, which is continuously driven by the engine, will then be effective in cylinder 36 of fluid motor 17 to move the piston 37 rearwardly and compress the spring 39. This movement of the piston will cause disengagement of the brake band from the drum, which disengagement will be almost simultaneous with the depressing of the accelerator pedal. The vehicle will not be started before the brakes are released due to the lost motion connection 23. Once the vehicle has started, pump 10 will be driven by the propeller shaft and fluid pressure developed by it will become effective in cylinder 36 to maintain piston 37 in its rearward position so that spring 39 will be compressed. Thus, with the pump 10 operating, the brake will continue to be maintained disengaged and its disengaged condition will no longer be dependent upon fluid pressure generated by pump 9. Thus, regardless of the condition of the shut-off valve 18, the brake can never become applied while the vehicle is moving. The depressing and releasing of the accelerator pedal during operation of the vehicle will no longer have any controlling action on the brake.

When the vehicle is again brought to a stop and the accelerator pedal is permitted to assume released position, the fluid pressure will no longer be effective in the fluid motor 17 and, therefore, the brake will be applied under the action of spring 39, thus preventing the vehicle from moving without the necessity of maintaining the service brakes applied. Any fluid pressure which may be trapped in cylinder 36 will be relieved by leakage through the gears of pump 10 which are no longer rotating. This may give a slight delayed action in the application of the brake but such is not undesirable.

When the vehicle is driven rearwardly pump 9 will be driven by the engine at a faster rate than pump 10 is driven reversely and, therefore, the pressure in conduit 15 will be sufficiently high to release brake 29. The slow reverse rotation of pump 10 will not cause sufficient pressure loss that the brake will not be released.

In the event it should be desired to disengage the brake 29 when the vehicle is stopped and there is no fluid pressure being developed by pump 9 as would be desired if the vehicle was to be towed or pushed, this can be accomplished by the operation of the cable 43 of the Bowden control. When the cable is pulled, lever 33 will be moved to disengage the brake band against the engaging action of spring 39.

Although I have shown the brake 29 as being associated with the propeller shaft exterior of the transmission, the brake may be positioned inside the transmission or may even be a part of the transmission. All that is required is some mechanism for preventing the turning of the propeller shaft and movement of the vehicle whenever the vehicle is brought to a stop and the accelerator assumes released position.

Being aware of the possibility of modifications in the particular structure herein described without department from the fundamental principles of my invention, I do not intend that its scope be limited except as set forth by the appended claims.

Having fully described my invention, what I claim as new and desire to secure by Letters Patent of the United States is:

1. In apparatus of the class described, a vehicle provided with a propelling engine and with a torque transmitting connection between the engine and the wheels, a fluid pressure system including a fluid pressure generator driven by the engine, a second fluid pressure system including a fluid pressure generator driven by an element of the torque transmitting connection which is operable only when the vehicle is moving, a brake for the vehicle, means for maintaining said brake disengaged by fluid pressure developed by either generator, and means for preventing the fluid pressure generated by the engine from being effective to maintain the brake disengaged whereby said brake can be engaged when the vehicle is stopped.

2. In apparatus of the class described, a vehicle provided with a propelling engine and with a torque transmitting connection between the engine and the wheels, a fluid pressure system including a fluid pressure generator driven by the engine, a second fluid pressure system including a fluid pressure generator driven by an element of the torque transmitting connection which is operable only when the vehicle is moving, a brake for the vehicle, means for maintaining said brake disengaged by fluid pressure developed by either generator, means for preventing the fluid pressure generated by the engine from being effective to maintain the brake disengaged whereby said brake can be engaged when the vehicle is stopped, and means for disengaging the brake independently of the fluid pressure developed by either generator.

3. In apparatus of the class described, a vehicle provided with a propelling engine and with a torque transmitting connection between the engine and the wheels, a fluid pressure system including a fluid pressure generator driven by the engine, a second fluid pressure system including a fluid pressure generator driven by an element of the torque transmitting connection which is operable only when the vehicle is moving, a brake associated with the torque transmitting connection, means for controlling the brake by fluid pressure developed by either of the generators, and control means associated with the engine driven generator for preventing the pressure developed thereby from being effective in controlling the brake.

4. In apparatus of the class described, a vehicle provided with a propelling engine and with a torque transmitting connection between the engine and the wheels, a fluid pressure system including a fluid pressure generator driven by the engine, a second fluid pressure system including a fluid pressure generator driven by an element of the torque transmitting connection which is operable only when the vehicle is moving, a brake for the vehicle, means for maintaining the brake disengaged when either generator is developing pressure, and valve means for preventing fluid pressure from the engine driven generator from being effective to maintain the brake disengaged.

5. In apparatus of the class described, a vehicle provided with a propelling engine having an accelerator mechanism and with a torque transmitting connection between the engine and the wheels, a fluid pressure system including a fluid pressure generator driven by the engine, a second fluid pressure system including a fluid pressure generator driven by an element of the torque transmitting connection which is operable only when the vehicle is moving, a brake associated with the torque transmitting connection, means for controlling the brake by fluid pressure developed by either of the generators, and means associated with the engine driven generator and controlled by the accelerator mechanism for preventing the pressure developed by said generator from being effective in controlling the brake when the accelerator mechanism is in released position.

6. In apparatus of the class described, a vehicle provided with a propelling engine having an accelerator mechanism and with a torque transmitting connection between the engine and the wheels, a fluid pressure system including a fluid pressure generator driven by the engine, a second fluid pressure system including a fluid pressure generator driven by an element of the torque transmitting connection which is operable only when the vehicle is moving, a brake for the vehicle, means for maintaining the brake disengaged when either generator is developing pressure, valve means for preventing fluid pressure from the engine driven generator from being effective to maintain the brake disengaged, and means for closing said valve means when the accelerator mechanism is released.

7. In apparatus of the class described, a vehicle provided with a propelling engine having an accelerator mechanism and with a torque transmitting connection between the engine and the wheels, a fluid pressure system including a fluid pressure generator driven by the engine, a second fluid pressure system including a fluid pressure generator driven by an element of the torque transmitting connection which is operable only when the vehicle is moving, a brake for the vehicle, spring means for applying the brake, a fluid motor for disengaging the brake and connected to be operated by fluid pressure developed by either generator, and means controlled by the accelerator mechanism for preventing the fluid pressure developed by the engine driven generator from being effective to disengage the brake when said accelerator mechanism is in released position.

8. In apparatus of the class described, a vehicle provided with a propelling engine having an accelerator mechanism and with a torque transmitting connection between the engine and the wheels, a fluid pressure system including a fluid pressure generator driven by the engine, a second fluid pressure system including a fluid pressure generator driven by an element of the torque transmitting connection which is operable only when the vehicle is moving, a brake associated with the torque transmitting connection, spring means for applying the brake, a fluid motor for disengaging the brake and connected to be operated by fluid pressure developed by either generator, valve means controlled by the accelerator mechanism for preventing fluid pressure developed by the engine driven generator from being effective to disengage the brake when said accelerator mechanism is in released position, and means for disengaging the brake independently of said pressures developed by the generators.

9. In apparatus of the class described, a vehicle provided with a propelling engine having an accelerator mechanism and with a torque transmitting connection between the engine and the wheels, a fluid pressure system including a fluid pressure generator driven by the engine, a second fluid pressure system including a fluid pressure generator driven by an element of the torque transmitting connection which is operable only when the vehicle is moving, a brake for the vehicle, spring means for applying the brake, a fluid motor for disengaging the brake and connected to be operated by fluid pressure developed by either generator, valve means controlled by the accelerator mechanism for preventing the fluid pressure developed by the engine driven generator from being effective to disengage the brake when said accelerator mechanism is in released position, and manual remote control means for disengaging the brake independently of the fluid pressures developed by the generators.

WALTER R. FREEMAN.